United States Patent
Tanabe et al.

(10) Patent No.: US 9,425,482 B2
(45) Date of Patent: Aug. 23, 2016

(54) SULFIDE SOLID ELECTROLYTE MATERIAL AND ELECTROCHEMICAL DEVICE

(71) Applicant: TDK CORPORATION, Tokyo (JP)

(72) Inventors: Junji Tanabe, Tokyo (JP); Tokuhiko Handa, Tokyo (JP)

(73) Assignee: TDK CORPORATION, Tokyo (JP)

( * ) Notice: Subject to any disclaimer, the term of this patent is extended or adjusted under 35 U.S.C. 154(b) by 78 days.

(21) Appl. No.: 14/176,359

(22) Filed: Feb. 10, 2014

(65) Prior Publication Data

US 2014/0227608 A1 Aug. 14, 2014

(30) Foreign Application Priority Data

Feb. 8, 2013 (JP) .................................. 2013-023383

(51) Int. Cl.
 H01M 10/0562 (2010.01)
 H01M 10/0525 (2010.01)

(52) U.S. Cl.
 CPC ...... H01M 10/0562 (2013.01); H01M 10/0525 (2013.01); H01M 2300/0068 (2013.01)

(58) Field of Classification Search
 CPC ..................... H01M 10/0525; H01M 10/0562; Y02E 60/122; Y02E 60/50
 USPC .................. 429/322, 205, 209, 218.1, 231.95
 See application file for complete search history.

(56) References Cited

U.S. PATENT DOCUMENTS

2012/0034529 A1  2/2012  Tatsumisago et al.
2012/0231348 A1  9/2012  Ohtomo et al.

FOREIGN PATENT DOCUMENTS

| CN | 102668219 A | 9/2012 | |
|---|---|---|---|
| JP | 2007-273214 | * 10/2007 | .............. H01B 1/06 |
| JP | A-2007-273214 | 10/2007 | |
| JP | A-2010-199033 | 9/2010 | |

* cited by examiner

*Primary Examiner* — Patrick Ryan
*Assistant Examiner* — Ben Lewis
(74) *Attorney, Agent, or Firm* — Oliff PLC

(57) ABSTRACT

A sulfide solid electrolyte material according to an embodiment of the present disclosure contains Li, P, and Bi. An electrochemical device according to an embodiment of the present disclosure includes a sulfide solid electrolyte material containing Li, P, and Bi.

11 Claims, 8 Drawing Sheets

SULFIDE SOLID ELECTROLYTE MATERIAL AND ELECTROCHEMICAL DEVICE

CROSS-REFERENCE TO RELATED APPLICATION

This application is based on Japanese Patent Application No. 2013-056635 filed with the Japan Patent Office on Mar. 19, 2013, the entire content of which is hereby incorporated by reference.

BACKGROUND

1. Technical Field

The present disclosure relates to a sulfide solid electrolyte material having high moisture resistance, and an electrochemical device containing this material.

2. Related Art

A lithium ion secondary battery has high capacity per weight or volume, so that it has been widely used in, for example, mobile devices. Research and development have been actively conducted on the use of lithium ion secondary battery in, for example, the application of electric vehicles that requires higher battery capacity.

A lithium ion secondary battery mainly includes a positive electrode, a negative electrode, and an electrolyte disposed between the positive electrode and the negative electrode.

In most cases, the lithium ion secondary battery uses a liquid electrolyte containing a flammable organic solvent. The secondary battery has therefore a safety mechanism for suppressing an increase in temperature due to short circuit. Moreover, the secondary battery takes structural countermeasures for preventing the electrolyte leakage. Thus, increasing the size and capacity of the lithium ion secondary battery leads to an increase in the need of the countermeasures.

On the other hand, research has also been conducted on an all-solid lithium ion secondary battery with a solid electrolyte. This secondary battery does not contain any flammable organic solvent in the electrolyte. Therefore, since this secondary battery can drastically solve the safety problems of the conventional batteries, this secondary battery has been extensively studied.

In recent years, development has been advanced on materials with a potential of 5 V or more relative in lithium metal reference to improve the capacity of the lithium ion secondary battery. In a lithium ion secondary battery containing a liquid electrolyte, however, the electrolyte has a narrow potential window, and may be thus decomposed when the battery is in operation. In contrast, a solid electrolyte with a wide potential window has advantages in that the electrolyte can be prevented from decomposing and can impart high capacity to the lithium ion secondary battery.

Materials of the solid electrolyte include organic materials, for example, an ionic conductive polymer material such as polyethylene oxide, and inorganic materials, for example, a solid oxide electrolyte material and a sulfide solid electrolyte material. The solid electrolyte containing any of those materials has lower lithium ion conductivity than the liquid electrolyte and therefore may be inferior in output characteristics. However, the sulfide solid electrolyte materials developed in recent years exhibit high ion conductivity as high as that of the liquid electrolyte. For this reason, the realization of the all-solid lithium ion secondary battery with high output has been expected (see JP-A-2007-273214 and JP-A-2010-199033).

SUMMARY

A sulfide solid electrolyte material according to an embodiment of the present disclosure contains Li, P, and Bi.

An electrochemical device according to an embodiment of the present disclosure includes a sulfide solid electrolyte material containing Li, P, and Bi.

DETAILED DESCRIPTION

Figure 1:
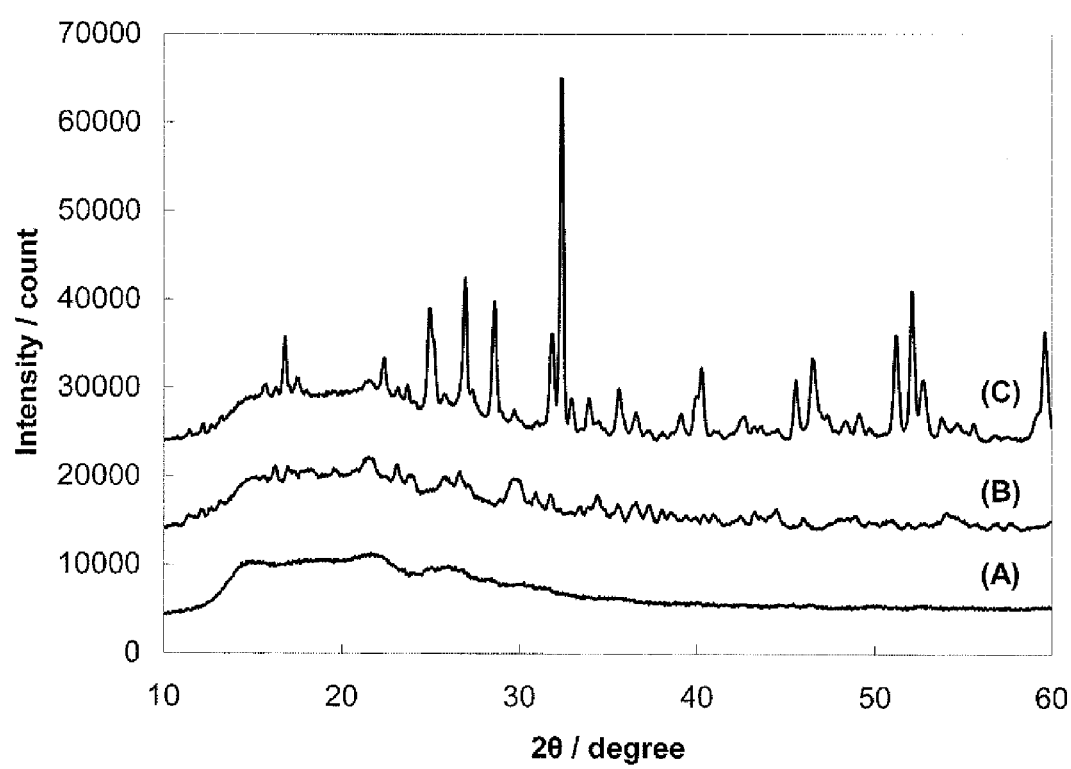
FIG. 1 is a graph in which (A) represents an X-ray diffraction spectrum of Example 11, (B) represents an X-ray diffraction spectrum of Example 12, and (C) represents an X-ray diffraction spectrum of Example 13.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

A conventional sulfide solid electrolyte material has poor moisture resistance, and may generate hydrogen sulfide when the material comes in contact with moisture in the air. Thus, a practically allowable sulfide solid electrolyte material has been hardly produced even using a sulfide solid electrolyte material described in JP-A-2010-199033.

An object of the present disclosure is to provide a sulfide solid electrolyte material having higher moisture resistance than a sulfide solid electrolyte material such as a lithium (Li)-phosphorus (P) based material, and an electrochemical device containing such a sulfide solid electrolyte material.

A sulfide solid electrolyte material according to an embodiment of the present disclosure (hereinafter, referred to as the present solid electrolyte material) contains Li, P, and bismuth (Bi). The elements can drastically improve the moisture resistance of the sulfide solid electrolyte material as compared with the conventional one.

When the entire content of the cationic element in the sulfide solid electrolyte material is 100 mol %, the present solid electrolyte material preferably contains 20 to 85 mol % of Li, 10 to 70 mol % of P, and 0.5 to 50 mol % of Bi. This composition can increase the moisture resistance of the sulfide solid electrolyte material in particular as compared with the conventional one.

When the total content of cationic elements in the sulfide solid electrolyte material is 100 mol %, the present solid electrolyte material preferably contains 60 to 80 mol % of Li, 13 to 30 mol % of P, and 1 to 25 mol % of Bi. This composition can further increase the moisture resistance in particular.

The present solid electrolyte material preferably includes crystals and non-crystals, thereby further improving its moisture resistance.

An electrochemical device according to an embodiment of the present disclosure includes the present solid electrolyte material.

Thus, the embodiments of the present disclosure can provide the sulfide solid electrolyte material having higher moisture resistance than a sulfide solid electrolyte material such as a Li—P-based material, and the electrochemical device containing such a sulfide solid electrolyte material.

The present solid electrolyte material contains Li, P, and Bi. When considering only the contents of the respective cationic elements in the sulfide solid electrolyte material, the present solid electrolyte material preferably contains 20 to 85 mol % of Li, 10 to 70 mol % of P, and 0.5 to 50 mol % of Bi, more preferably 60 to 80 mol % of Li, 13 to 30 mol % of P, and 1 to 25 mol % of Bi. From the viewpoint of the stability of the sulfide solid electrolyte material, the cationic elements are preferably $Li^+$, $P^{5+}$, and $Bi^{3+}$. In other words, the valence of Li (Li cation) is preferably 1, the valence of P (P cation) is preferably 5, and the valence of Bi (Bi cation) is preferably 3. The total proportion of Li, P, and Bi in the entire cationic elements is preferably 99 mol % or more. In other words, when the entire cationic elements contained in the present solid electrolyte material is 100 mol %, the total proportion of Li, P, and Bi is preferably 99 mol % or more.

The present solid electrolyte material may contain impurities in addition to Li, P, and Bi. The impurities may be, for example, cations of aluminum, silicon, gallium, germanium, indium, tin, zinc, and so on. The concentration of the impurities is preferably 5 wt % or less of the entire present solid electrolyte material. In other words, the concentration of the cationic impurities is preferably 5 wt % or less. If the impurity concentration is 5 wt % or more, the desired moisture resistance may not be obtained. The cationic impurities can be determined using an analysis apparatus such as an inductively coupled plasma (ICP) apparatus.

The present solid electrolyte material further contains sulfur (S) as an anionic element. The amount of S is determined based on the valences of the cations in the material to make the present solid electrolyte material neutral as a whole. From the viewpoint of the stability of the present solid electrolyte material, the anion is preferably $S^{2-}$. In other words, the present solid electrolyte material preferably contains bivalent sulfur (sulfur anion).

The anionic elements of the present solid electrolyte material may include not only sulfur but also oxygen. When the present solid electrolyte material contains oxygen, the oxygen concentration is preferably 10 wt % or less of the entire material. If the oxygen concentration is 10 wt % or more, the desired lithium ion conductivity may not be obtained. The oxygen concentration can be determined using an oxygen/nitrogen elemental analyzer such as TC-600 available from LECO Corporation.

The present solid electrolyte material may contain anions other than oxygen as impurities. The concentration of the impurities is preferably 5 wt % or less. If the impurity concentration is 5 wt % or more, the desired moisture resistance may not be obtained. The impurities can be determined using, for example, ion chromatography or X-ray fluorescence analysis (XRF).

In spite of not clearing a mechanism of why the present solid electrolyte material exhibits high moisture resistance, a novel broad peak can be confirmed in the Raman spectrum of the present solid electrolyte material. An unknown unit corresponding to the peak is firm and has high moisture resistance. Thus, such a unit may impart high moisture resistance to the entire solid electrolyte.

The present solid electrolyte material may be either crystals or non-crystals; however, the present solid electrolyte material preferably has both crystals and non-crystals. This provides high moisture resistance.

The raw materials of the present solid electrolyte material may be, for example, sulfides respectively containing $Li_2S$, $P_2S_5$, and $Bi_2S_3$, single-element materials respectively containing Li, P, S, and Bi, or a phosphides containing $Li_3P$.

The present solid electrolyte material can be manufactured by preparing a raw material composition through a mechanical milling method or a melt quenching method. In particular, the mechanical milling method is preferably used. This method allows its procedures to be performed at room temperature, thereby simplifying a manufacturing process.

The present solid electrolyte material can be used for an electrochemical device. Examples of the electrochemical device include a lithium ion secondary battery, a primary battery, a secondary battery, a fuel cell, and an electrochemical capacitor. The use of the present solid electrolyte material as an electrolyte layer of the electrochemical device can provide for an electrochemical device having high moisture resistance. As the components of the electrochemical device other than the electrolyte, known materials can be appropriately used.

When using the present solid electrolyte material for preparing the lithium secondary battery, the material may be used not only as an electrolyte but also used as a positive electrode mixture and a negative electrode mixture, which are disposed to have the electrolyte held therebetween.

The positive electrode mixture of the lithium ion secondary battery contains a positive electrode active material and a conductive auxiliary agent. As the positive electrode active material, a known material can be used. Specific examples of the positive electrode active material include a layered rock salt material such as lithium cobaltate or lithium nickel manganese cobaltate, a spinel material such as lithium manganite, an olivine material such as lithium iron phosphate or vanadium lithium phosphate, and a sulfide material such as lithium sulfide or titanium sulfide. Examples of the conductive auxiliary agent include natural graphite (such as flake graphite or amorphous graphite), synthetic graphite, carbon black, acetylene black, Ketjen black, carbon whisker, carbon fiber, and a conductive ceramic material. Further mixing the present solid electrolyte material in the positive electrode mixture makes it difficult for the positive electrode active material and the electrolyte in the electrolyte layer to be in contact with each other. Therefore, the present solid electrolyte material can improve the moisture resistance of the electrochemical device.

The negative electrode mixture of the lithium ion secondary battery contains the negative electrode active material. The negative electrode active material may be, for example, a carbon material such as graphite, a metal material such as lithium or silicon, or an oxide material such as lithium titanate. The negative electrode mixture may contain the conductive auxiliary agent. Examples of the conductive auxiliary agent include natural graphite (such as flake graphite or amorphous graphite), synthetic graphite, carbon black, acetylene black, Ketjen black, carbon whisker, carbon fiber, and a conductive ceramic material. Further mixing the present solid electrolyte material in the negative electrode mixture makes it difficult for the negative electrode active material and the electrolyte in the electrolyte layer to be in contact with each other. Therefore, the present solid electrolyte material can improve the moisture resistance of the electrochemical device.

A preferred embodiment of the sulfide solid electrolyte material of the present disclosure has been described so far. The present disclosure is not limited to the above embodiment. The mode of the sulfide solid electrolyte material that is the same in the technical idea is included in the present disclosure.

EXAMPLES

The present disclosure is hereinafter described in detail based on Examples and Comparative Examples. The present disclosure is not limited to the examples below.

Example 1

First, 0.792 g of lithium sulfide (Furuuchi Chemical Corporation), 0.639 g of phosphorus sulfide (Aldrich), and 0.740 g of bismuth sulfide (Kojundo Chemical Laboratory) were prepared. These components were mixed and pulverized for 20 hours at 370 rpm in a planetary ball mill under an argon atmosphere with a dew point of −40° C. or less. Thus, a sulfide solid electrolyte material according to Example 1 was obtained. The obtained sulfide solid electrolyte material was subjected to the X-ray diffraction analysis. As a result, it was found that the most part of the material was non-crystal.

Examples 2 to 4, 6 to 11, and 14 to 18

The sulfide solid electrolyte materials of Examples 2 to 4, 6 to 11, and 14 to 18 were obtained in a manner similar to Example 1 except as follows: In these examples, the ratio of the elements, Li of lithium sulfide, P of phosphine sulfide, and Bi of bismuth sulfide, in the composition was changed to the composition ratio shown in Table 1.

Examples 5, 12, and 13

The sulfide solid electrolyte material of Example 5 was obtained in a manner similar to Example 4 except as follows: In these examples, a thermal treatment was conducted for an hour at 290° C. under an argon atmosphere with a dew point of −40° C. or less. The sulfide solid electrolyte material of Example 12 was obtained in a manner similar to Example 11 except that thermal treatment was conducted for an hour at 270° C. under an argon atmosphere with a dew point of −40° C. or less. The sulfide solid electrolyte material of Example 13 was obtained in a manner similar to Example 11 except that thermal treatment was conducted for an hour at 380° C. under an argon atmosphere with a dew point of −40° C. or less.

Comparative Examples 1 to 8

The sulfide solid electrolyte materials of Comparative Examples 1 to 8 were obtained in a manner similar to Example 1 except as follows: In these examples, the ratio of the elements, Li of lithium sulfide, P of phosphorus sulfide, and Bi of bismuth sulfide, in the composition was changed to the composition ratio shown in Table 1.
(Determination of Moisture Resistance)

Each of the obtained sulfide solid electrolyte materials of Examples 1 to 18 and Comparative Examples 1 to 8 was weighed 50 mg and placed in a 2-mL vial under an argon atmosphere with a dew point of −40° C. or less. This solid electrolyte was disposed in a 500-mL beaker in the air, and the beaker was then covered with a lid. The material was left for 10 minutes to make the moisture in the beaker react with the solid electrolyte to generate hydrogen sulfide. With the use of the gas sampling pump, GV-100S (GASTEC), and the hydrogen sulfide detector tube, 4LB (GASTEC), the concentration of hydrogen sulfide in the beaker was determined in the concentration range of 0.5 to 12 ppm.

TABLE 1

|  | Li/mol % | P/mol % | Bi/mol % | Concentration of hydrogen sulfide/ppm |
|---|---|---|---|---|
| Example 1 | 80.0 | 13.0 | 7.0 | 0.5 |
| Example 2 | 76.6 | 22.9 | 0.5 | 2.0 |
| Example 3 | 76.2 | 22.8 | 1.0 | 0.5 |
| Example 4 | 74.7 | 22.3 | 3.0 | 0.5 |
| Example 5 | 74.7 | 22.3 | 3.0 | 0.5 |
| Example 6 | 75.0 | 25.0 | 5.0 | 0.5 |
| Example 7 | 70.0 | 20.0 | 10.0 | 0.5 |
| Example 8 | 70.0 | 25.0 | 5.0 | 0.5 |
| Example 9 | 69.6 | 29.9 | 0.5 | 2.5 |
| Example 10 | 69.3 | 27.1 | 1.0 | 0.5 |
| Example 11 | 65.0 | 30.0 | 5.0 | 0.5 |
| Example 12 | 65.0 | 30.0 | 5.0 | <0.5 |
| Example 13 | 65.0 | 30.0 | 5.0 | 0.5 |
| Example 14 | 65.0 | 25.0 | 10.0 | 0.5 |
| Example 15 | 60.0 | 30.0 | 10.0 | 0.5 |
| Example 16 | 60.0 | 20.0 | 20.0 | 0.5 |
| Example 17 | 20.8 | 62.4 | 16.8 | 1.5 |
| Example 18 | 26.3 | 26.2 | 47.5 | 1.0 |
| Comparative Example 1 | 87.5 | 12.5 | 0.0 | >12 |
| Comparative Example 2 | 80.0 | 20.0 | 0.0 | >12 |
| Comparative Example 3 | 75.0 | 25.0 | 0.0 | >12 |
| Comparative Example 4 | 66.7 | 33.3 | 0.0 | >12 |
| Comparative Example 5 | 20.0 | 80.0 | 0.0 | >12 |
| Comparative Example 6 | 90.0 | 0.0 | 10.0 | >12 |
| Comparative Example 7 | 80.0 | 0.0 | 20.0 | >12 |
| Comparative Example 8 | 20.0 | 0.0 | 80.0 | >12 |

The results of determining the moisture resistance are shown in Table 1. It has been confirmed from Table 1 that the amount of hydrogen sulfide generated in the air is largely suppressed and the moisture resistance is increased in the sulfide solid electrolyte material containing Li, P, and Bi of Examples 1 to 18. In particular, the sulfide solid electrolyte materials of Examples 1 to 18 contain 20 to 85 mol % of Li, 10 to 70 mol % of P, and 0.5 to 50 mol % of Bi. In contrast, hydrogen sulfide at relatively high concentration was detected in the materials of Comparative Examples 1 to 8.

Further, the material obtained in Example 3 is superior to the material obtained in Example 2. In addition, the material obtained in Example 10 is superior to the material obtained in Example 9. As a result, it is confirmed that the amount of hydrogen sulfide generated in the air is suppressed particularly in the sulfide solid electrolyte material containing 60 to 80 mol % of Li, 13 to 30 mol % of P, and 1 to 25 mol % of Bi.

FIG. 1 illustrates X-ray diffraction spectra of solid electrolyte material synthesized in Examples 11 to 13. The solid electrolyte material of the spectrum of Example 11 synthesized by the mechanical milling method does not exhibit the explicit peak (FIG. 1, (A)). Thus, it is confirmed that the material obtained in Example 11 is non-crystalline. The spectrum of Example 12 in which the thermal treatment was conducted at 270° C. includes a number of unknown small peaks (plotted+10000 counts, (B) in FIG. 1). It is confirmed that a crystalline phase is deposited in non-crystalline phase in Example 12. Moreover, in the spectrum of Example 13 in which the thermal treatment was conducted at 380° C. includes sharp and high peaks at positions different from the spectrum of Example 11 (plotted+20000 counts, (C) in FIG.

1). This indicates that the non-crystalline phase has disappeared due to the large growth of crystals in Example 13. Table 1 indicates the following. The material obtained in Example 12 has crystals and non-crystals. Therefore, the amount of hydrogen sulfide generated in the air was suppressed in Example 12 more than in Example 11 or 13. As a result, it is confirmed that the sulfide solid electrolyte material having the crystals and non-crystals can have higher moisture resistance.

Figure 2:
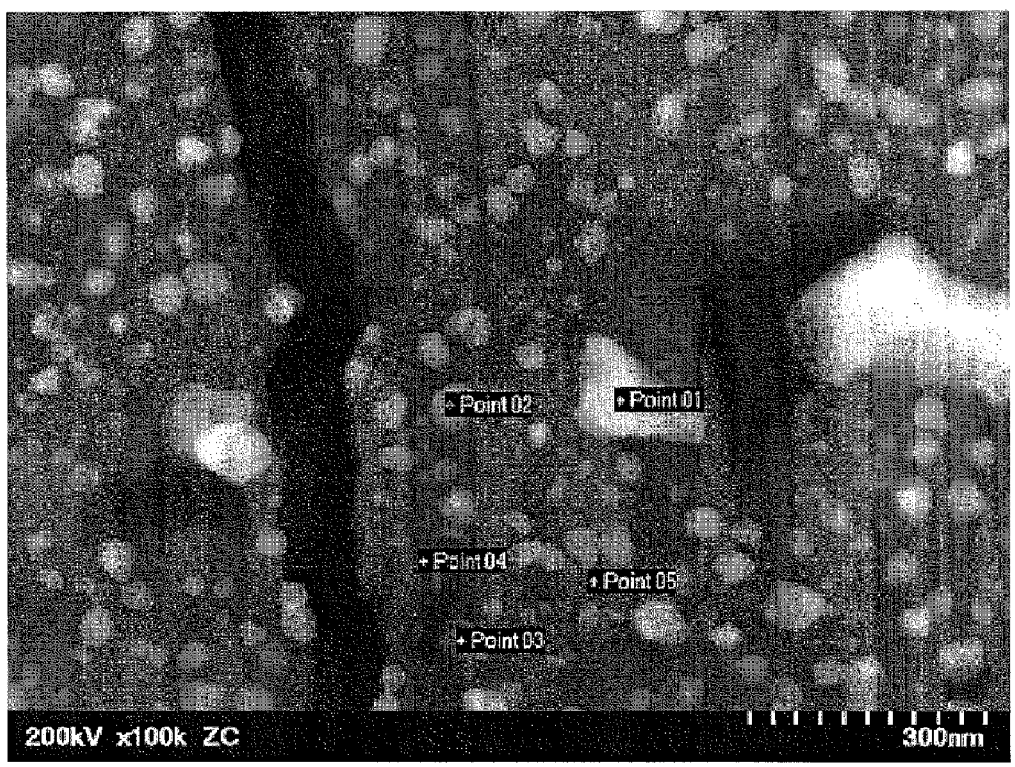
FIG. 2 is a Z-contrast image obtained using a transmission electron microscope according to Example 5.
Figure 3:
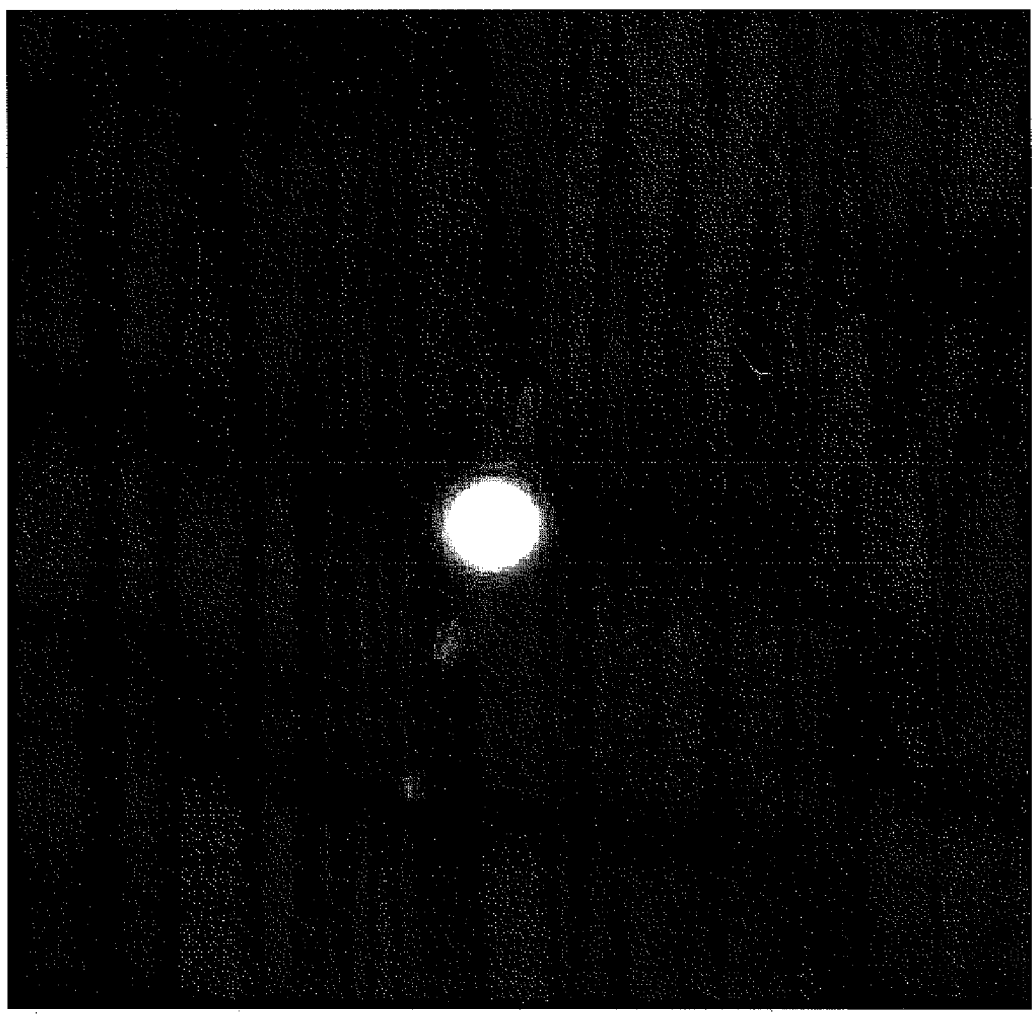
FIG. 3 is an electron diffraction image at Point 1 in FIG. 2.
Figure 4:
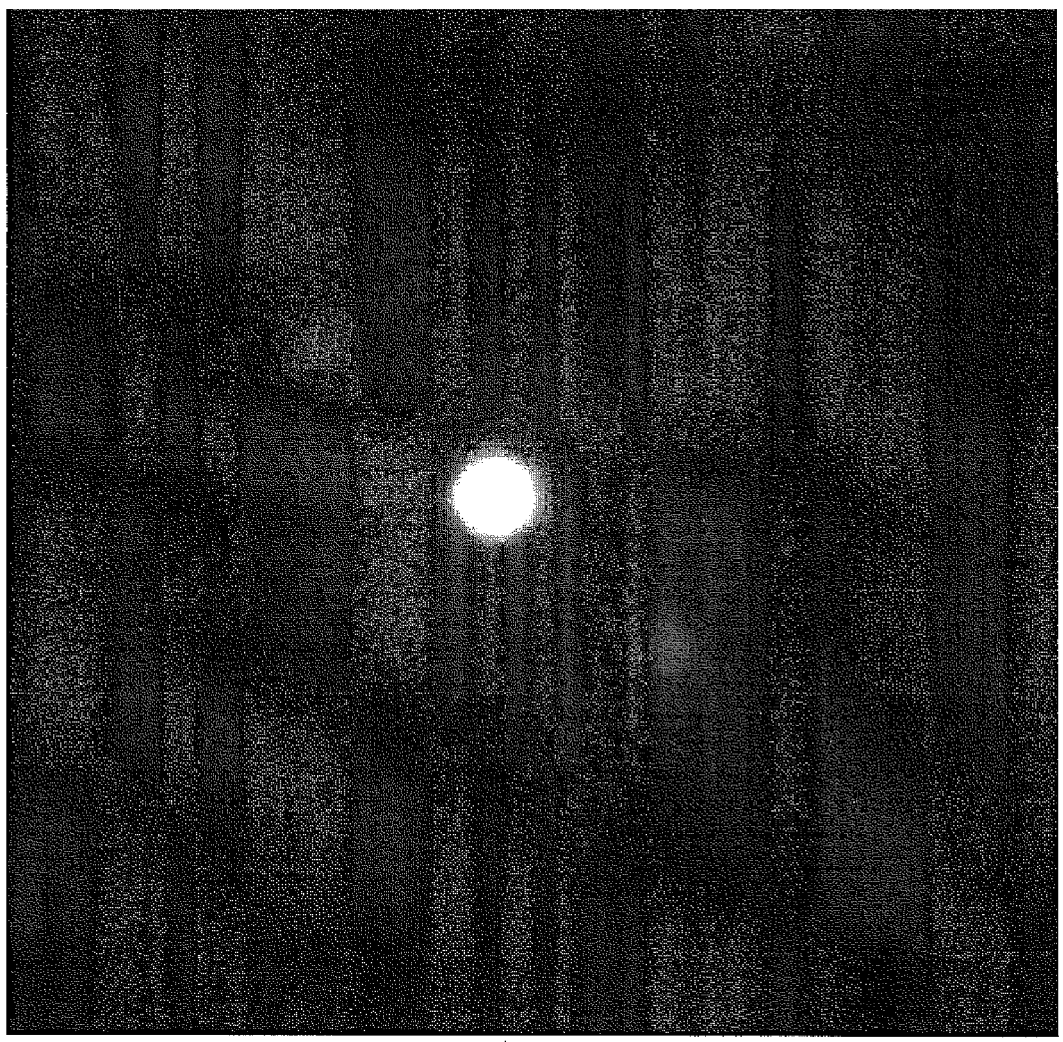
FIG. 4 is an electron diffraction image at Point 2 in FIG. 2.
Figure 5:
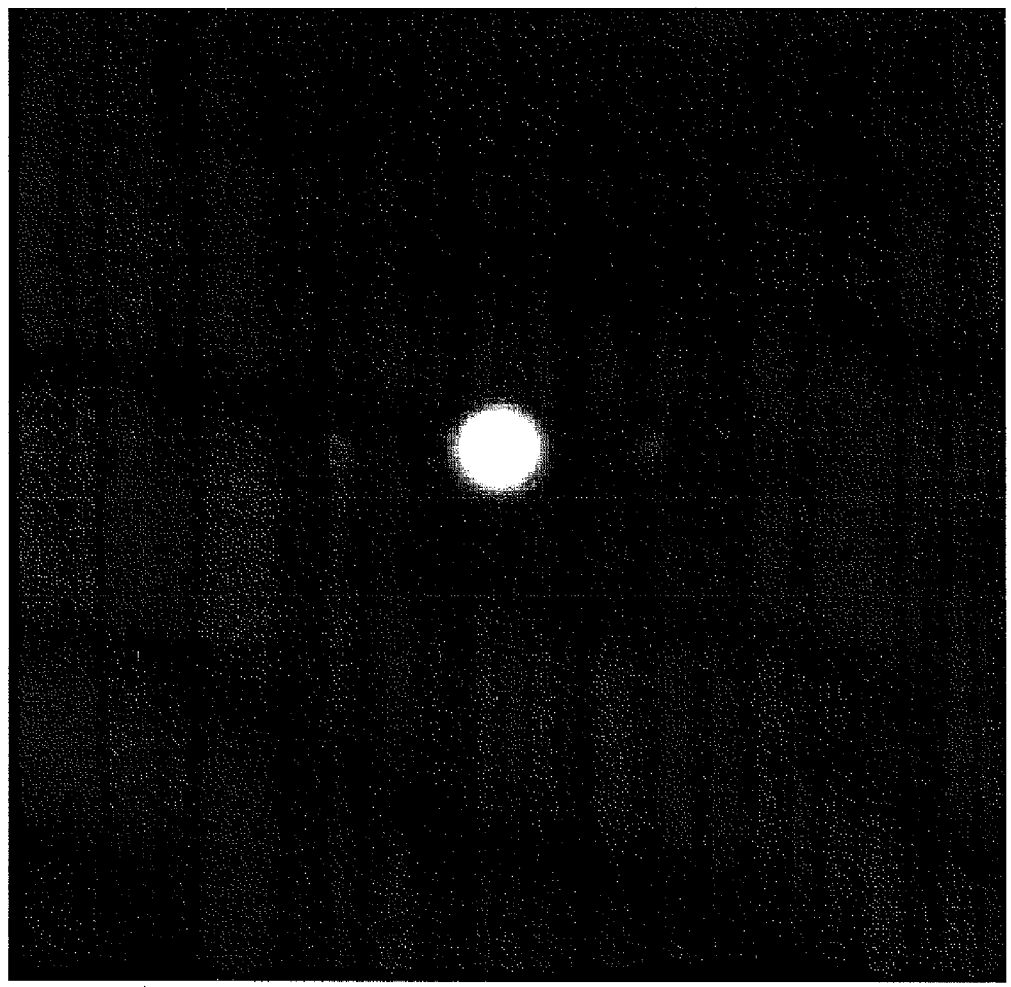
FIG. 5 is an electron diffraction image at Point 3 in FIG. 2.
Figure 6:
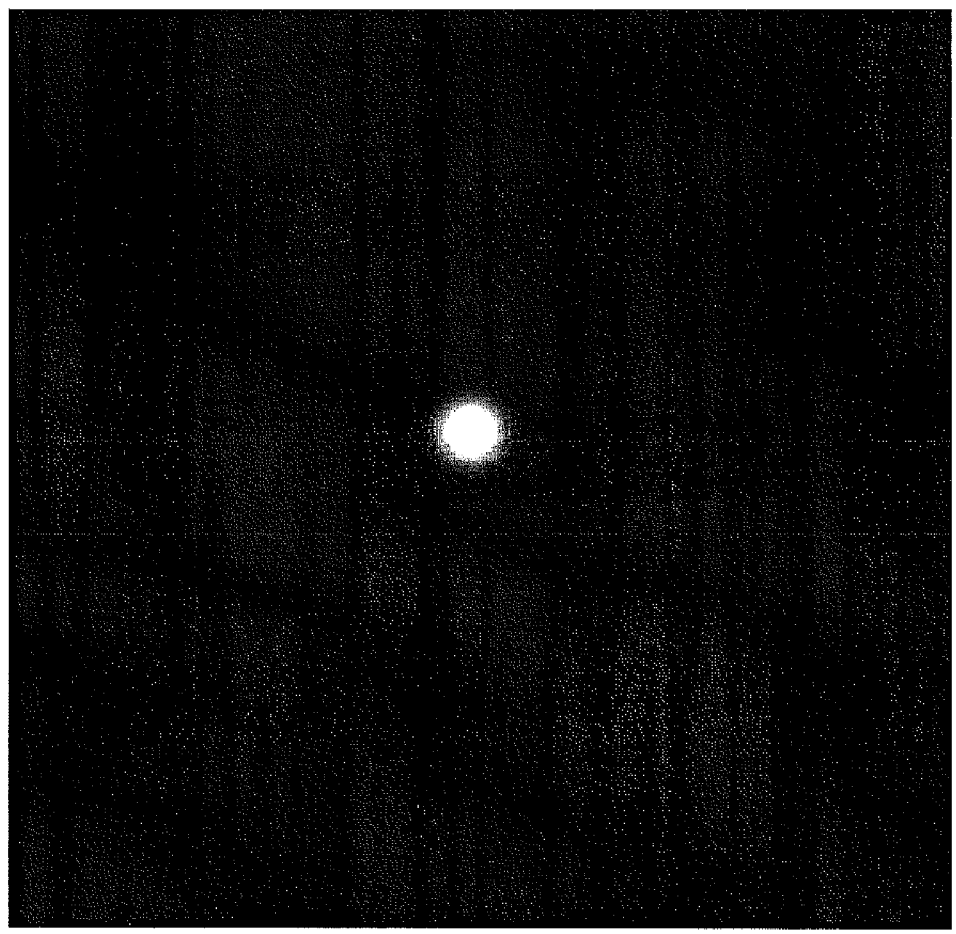
FIG. 6 is an electron diffraction image at Point 4 in FIG. 2.
Figure 7:
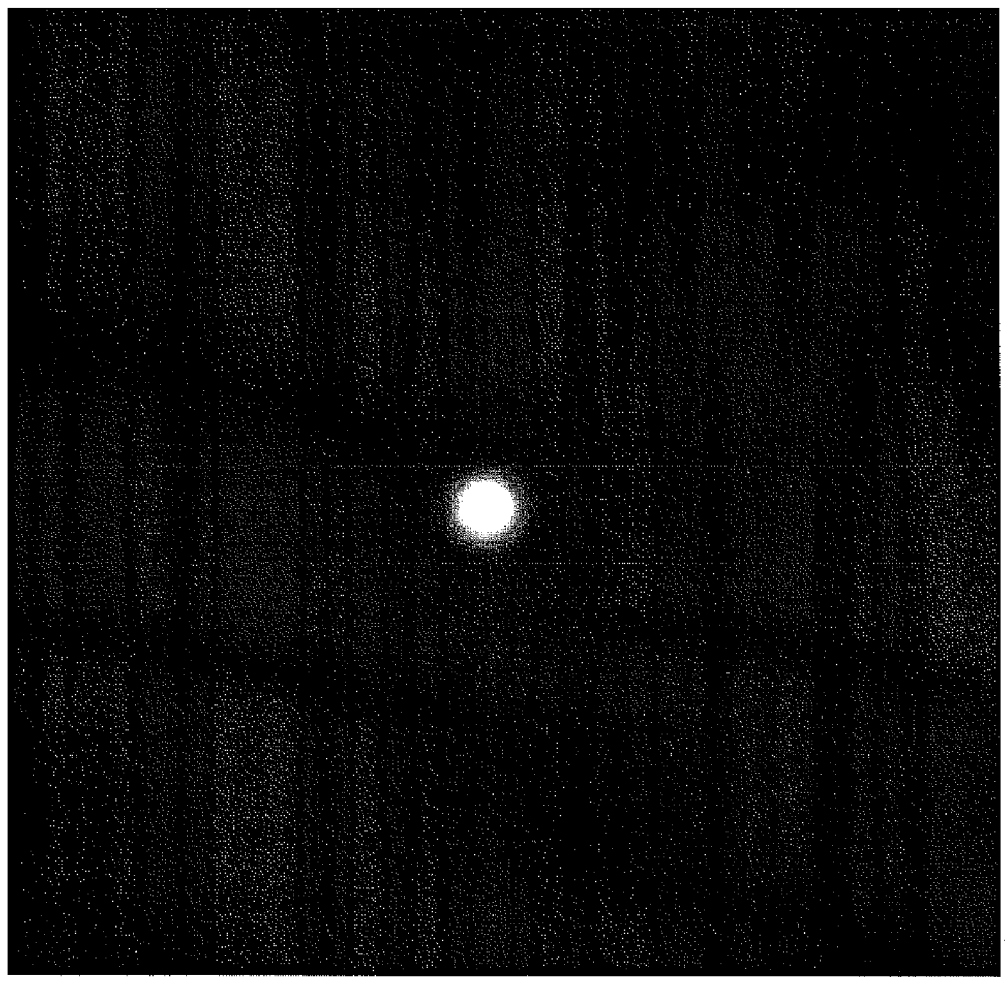
FIG. 7 is an electron diffraction image at Point 5 in FIG. 2.

FIG. 2 is the Z-contrast image obtained using a transmission electron microscope in Example 5. Moreover, the electron diffraction images of Points 01 to 05 of FIG. 2 are shown in FIG. 3 to FIG. 7. It is difficult to identify the crystal plane of Points 01 to 03. It can be confirmed, however, that Points 01 to 03 are crystalline and Points 04 to 05 are non-crystalline. It can be confirmed that the material obtained in Example 5 has crystals and non-crystals.

Figure 8:
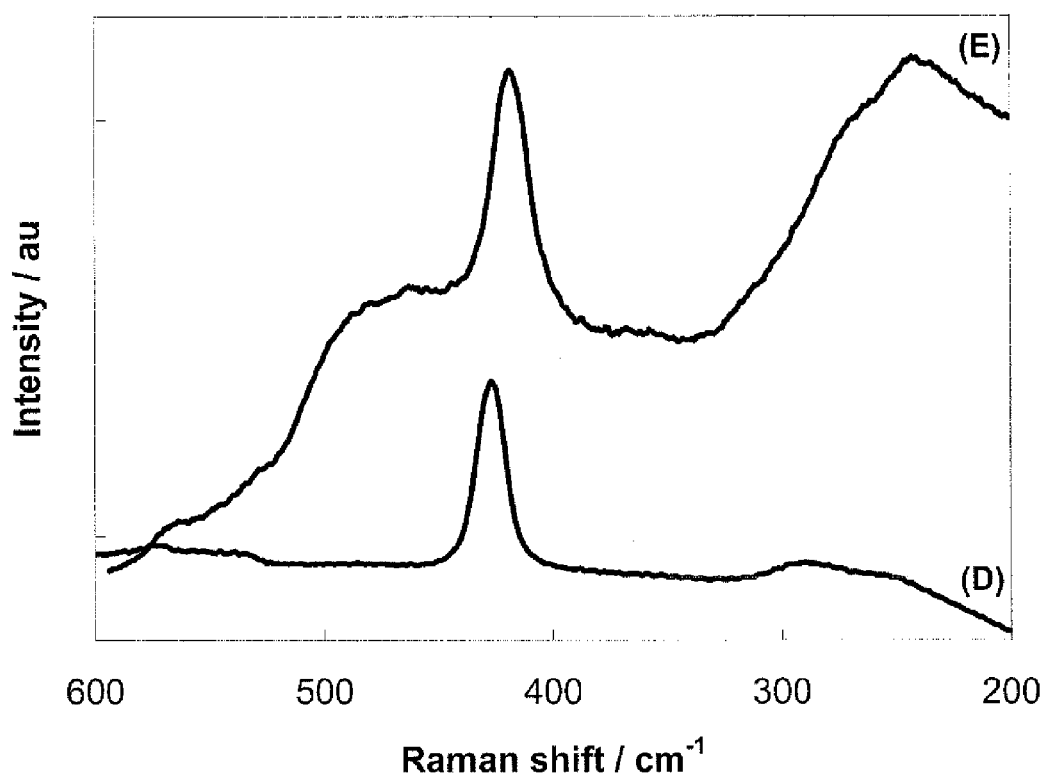
FIG. 8 is a graph in which (D) represents the Raman spectrum of Comparative Example 2 and (E) represents the Raman spectrum of Example 5.

FIG. 8 depicts the Raman spectrums of Example 5 and Comparative Example 2. In Comparative Example 2, a $PS_4$ unit was observed at 425 cm$^{-1}$ ((D) in FIG. 8). On the other hand, in Example 5, the $PS_4$ unit was observed at 420 cm$^{-1}$ and moreover novel broad peaks were observed at 245 cm$^{-1}$ and 460 to 490 cm$^{-1}$ ((E) in FIG. 8). This indicates that the novel units with the unknown structures were obtained in Example 5.

The conductivity of the material obtained in Example 5 was determined. As a result, the lithium ion conductivity relative to the electron conduction of $3.4 \times 10^{-8}$ Scm$^{-1}$ was $6.4 \times 10^{-4}$ Scm$^{-1}$, which was excellent. This indicates that the sulfide solid electrolyte material obtained in Example 5 can be suitably used for the lithium ion secondary battery.

Note that the sulfide solid electrolyte material of the present disclosure is applicable for other electrochemical devices than the lithium ion secondary battery. Examples of the electrochemical device include the devices other than the lithium ion secondary battery, such as a primary battery, a secondary battery, a fuel cell, and an electrochemical capacitor. The electrochemical device with the technical characteristics of the present disclosure can be used for a power source for a self-running micromachine or an IC card, a dispersed power source disposed on or within a printed board, or a polymer actuator. The electrochemical device can also be used for a gas sensor for sensing carbon dioxide, for example.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A sulfide solid electrolyte material comprising Li, P, and Bi, wherein the oxygen concentration of anions is 10 wt % or less.

2. The sulfide solid electrolyte material according to claim 1, wherein the content of Li is 20 to 85 mol %, the content of P is 10 to 70 mol %, and the content of Bi is 0.5 to 50 mol %, when the entire cationic elements contained in the sulfide solid electrolyte material is assumed to be 100 mol %.

3. The sulfide solid electrolyte material according to claim 2 having crystals and non-crystals.

4. The sulfide solid electrolyte material according to claim 1, wherein the content of Li is 60 to 80 mol %, the content of P is 13 to 30 mol %, and the content of Bi is 1 to 25 mol %, when the entire cationic elements contained in the sulfide solid electrolyte material is assumed to be 100 mol %.

5. The sulfide solid electrolyte material according to claim 4 having crystals and non-crystals.

6. The sulfide solid electrolyte material according to claim 1 having crystals and non-crystals.

7. The sulfide solid electrolyte material according to claim 1, wherein the valence of Li is 1, the valence of P is 5, and the valence of Bi is 3.

8. The sulfide solid electrolyte material according to claim 1, wherein the total proportion of Li, P, and Bi is 99 mol % or more when the entire cationic elements contained in the sulfide solid electrolyte material is assumed to be 100 mol %.

9. The sulfide solid electrolyte material according to claim 1, wherein the concentration of cationic impurities is 5 wt % or less.

10. The sulfide solid electrolyte material according to claim 1, further comprising bivalent sulfur.

11. An electrochemical device containing the sulfide solid electrolyte material according to claim 1.

* * * * *